Aug. 11, 1942.  W. A. RAY  2,292,477
FLUID CONTROL VALVE
Filed June 14, 1939  2 Sheets-Sheet 1
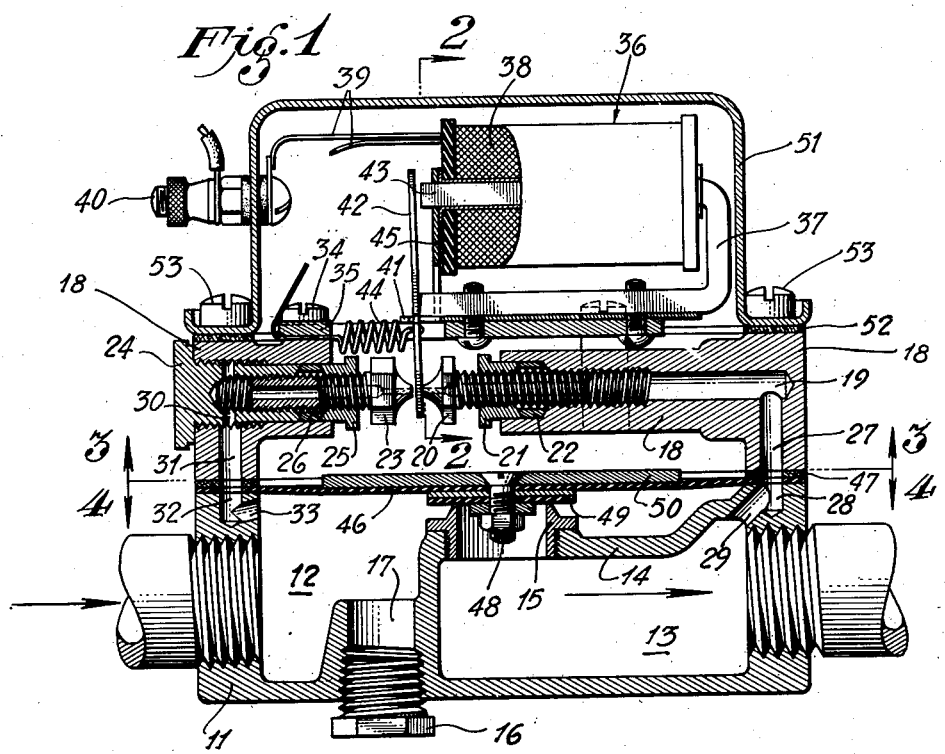
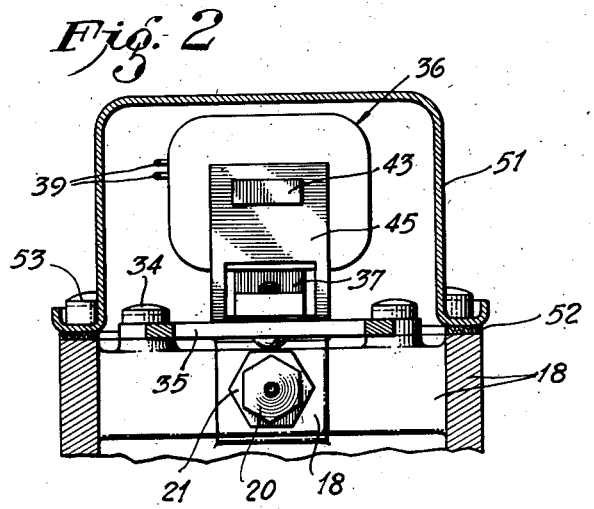
WILLIAM A. RAY,
INVENTOR.
BY John H. Rouse,
ATTORNEY.

Aug. 11, 1942.   W. A. RAY   2,292,477
FLUID CONTROL VALVE
Filed June 14, 1939   2 Sheets-Sheet 2

WILLIAM A. RAY,
INVENTOR.

BY John H. Rouse,
ATTORNEY.

Patented Aug. 11, 1942

2,292,477

UNITED STATES PATENT OFFICE 2,292,477

FLUID CONTROL VALVE

William A. Ray, Glendale, Calif.

Application June 14, 1939, Serial No. 279,220

4 Claims. (Cl. 137—139)

My present invention relates to pilot controlled, fluid pressure operated valves, and particularly to those of the type employing automatic means for actuating the pilot valve.

A main object of my invention is the provision of a valve of the type described which is reliable, simple, and compact in its construction, and relatively inexpensive to manufacture.

Another object of my invention is the provision of a novel pilot valve assembly which may be so mounted on the main valve casing as to afford a rigid structure wherein the component parts are securely maintained in operative condition.

Another object is the provision of a valve of the character described which is simple to install and which has no exposed tubing nor connections for the pilot valve or vent.

Other objects and advantages of my invention will be found in the description, the drawings and the appended claims.

For complete understanding of the invention, reference may be had to the following detailed description and accompanyig drawings, wherein:

Figure 1 is a sectional view of a valve embodying my invention;

Figure 2 is a fragmentary section taken along the line 2—2 of Fig. 1; and

Figure 3:
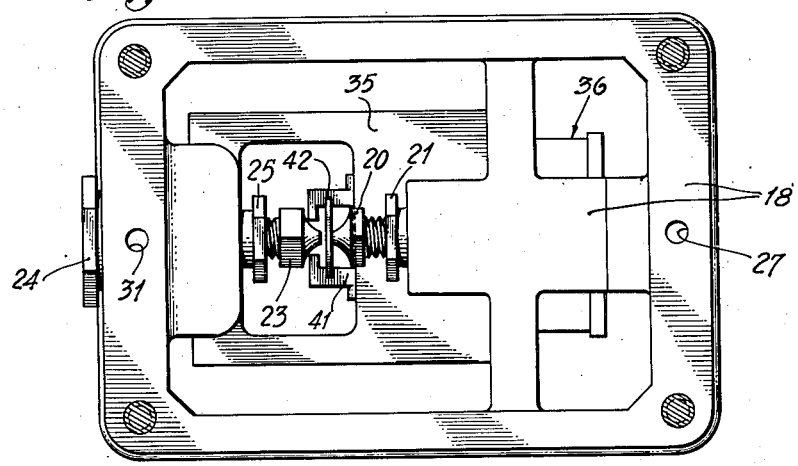
Figure 4:
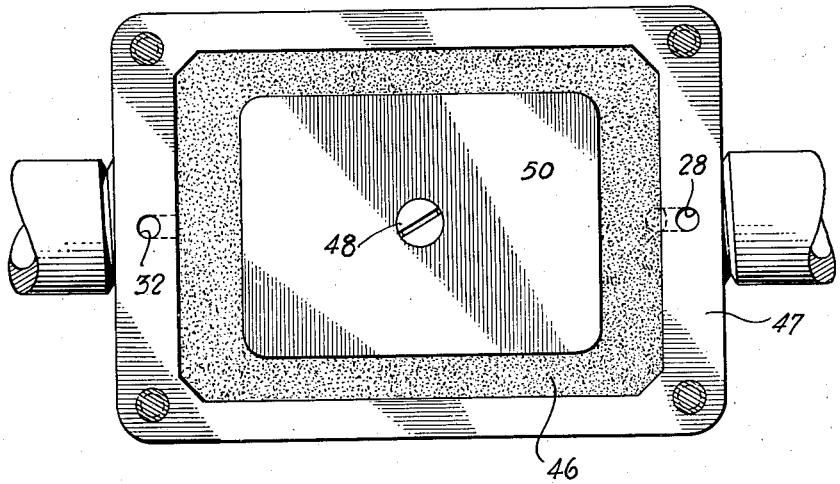

Figures 3 and 4 are views in elevation of the upper and lower portions of the valve taken on the lines 3—3 and 4—4, respectively, of Fig. 1.

In the drawings, the numeral 11 indicates a main valve casing having an inlet 12 and an outlet 13 separated by a ported partition 14 threadedly receiving a valve seat member 15. A plug 16 closes an opening 17, communicating with the valve inlet 12, for convenient connection of, for example, a pilot burner.

Secured to the top of the valve casing, and coextensive therewith, is an integrally formed member or casting 18 which forms the main part of a pilot valve structure. Threadedly received in an opening 19 in the casting is a hollow valve port or jet member 20 which is sealingly retained in adjusted position by a nut 21 and gasket 22. A second jet member 23 is threaded into a hollow fitting 24, which fitting is threaded in a side wall of the casting. A nut 25 and gasket 26 serve to sealingly secure the jet member in position.

The opening 19 communicates with a vertical opening 27, in a dependent side wall of the casting, which is arranged to register with another opening 28 formed in a side wall of the valve casing, and an angular opening 29 connects the aforesaid openings with the main valve outlet 13. A transverse opening 30 in the jet supporting member 24 communicates with a vertical opening 31, in a dependent side wall of the pilot valve casting, registering with another opening 32 formed in a side wall of the valve casing, and a side opening 33 connects the aforesaid openings with the main valve inlet 12. It will be seen that thus the orifices of the jet members 20 and 23 are in fluid communication with the main valve outlet and inlet, respectively.

Secured to the upper portion of the casting 18, as by screws 34, is a plate 35 on which is mounted an electromagnetic device, generally indicated at 36, and comprising a U-shaped core 37 carrying on its upper leg an energizing coil 38 having leads 39 connected to insulated terminal posts 40.

Fulcrumed on the end of the lower leg of the core 37, and retained by a slotted member 41, is an armature 42, the upper end portion of which is attracted toward core pole 43 when the electromagnet 36 is energized. A compression spring 44 biases the armature away from the pole 43. A bent-up portion 45 of the member 41 engages the pole 43 and holds it securely with respect to the other leg of the core. The lower end portion of the armature cooperates with the jets 20 and 23 by contact with the end surfaces thereof to control fluid flow through the jets.

Interposed between the connecting surfaces of the valve casing 11 and the pilot valve casting 18 is a flexible diaphragm 46 and a gasket 47. Secured to the diaphragm, by a screw 48, is a valve member 49 cooperable with the main valve seat member 15. A weight-biasing and stiffening member for the diaphragm is provided by a plate 50.

Covering the upper portion of the pilot valve casting 18 is a housing 51, a sealing gasket 52 being interposed between the connecting surfaces. Screws 53, extending through the casting 18, are threaded into the casing 11 to hold the housing and the casting in assembled relation with the valve casing.

The operation of the valve is as follows:

Assuming that the valve is connected to a source of fluid under pressure, with the armature in its unattracted position as shown in the drawings, fluid passes from the inlet 12 through openings 33, 32, 31 and 30 and the open jet member 23 into the area above the diaphragm. Jet 20 being closed, the fluid pressure above and below the diaphragm is equalized and the main valve remains closed on account of the gravity bias of the valve member and plate 50.

When the electromagnet 36 is energized, the armature is magnetically moved to close jet 23 and open jet 20. The compressed fluid above the diaphragm may now escape through the open jet member 20 and openings 19, 27, 28 and 29 to the valve outlet 13, permitting the fluid pressure below the diaphragm to move the same upward to open the valve.

According to my invention, other valve control systems may be employed, such as, for example, the well known "leak port" system in which a constant bleed of fluid from the main valve inlet to the area above the diaphragm is permitted, control being effected by opening or closing the jet communicating with the main valve outlet.

Also, the particular form of pilot valve actuating means which I have shown is not an essential part of my present invention as other means, such as, for example, thermal responsive means, may be employed to actuate the armature or pilot valve member.

Also, it is obvious that modifications may be made in the structure which I have shown and described as illustrative of my invention without departing from the spirit thereof. I intend therefore that my invention be limited only by the scope of the appended claims.

I claim as my invention:

1. In a pilot-controlled fluid pressure operated valve: a main valve casing having a bottom and side walls; a pilot-valve structure substantially coextensive with and secured to the upper surface of said casing; said structure having a top and a side wall and an opening through one of said walls; a housing mounted on the outer surface of said one of said walls and surrounding said opening; a flexible diaphragm member interposed at its margin between the interconnecting surfaces of the casing and the structure to form with the casing a lower pressure chamber, and with the structure and housing an upper pressure chamber; means connected to said diaphragm for controlling fluid flow through the main valve casing; a jet member opening in said upper chamber for controlling the pressure of the fluid therein and located adjacent the opening in the wall of the structure; and electromagnetic means within said housing and mounted on the outer surface of the structure for covering and uncovering said jet member and thereby to control the movement of the diaphragm, said last-named means including an arm extending unconfined through said opening.

2. In a pilot-controlled fluid pressure operated valve: a main valve casing having a bottom and side walls; a relatively shallow pilot-valve structure substantially coextensive with and secured to the upper surface of said casing and having a top and a side wall; said top wall being substantially parallel to the upper surface of the casing and having an opening therethrough; a housing mounted on the top surface of said structure and surrounding said opening; a flexible diaphragm member interposed at its margin between the interconnecting surfaces of the casing and the structure to form with the casing a lower pressure chamber, and with the structure and housing an upper pressure chamber; means connected to said diaphragm for controlling fluid flow through the main valve casing; a jet member, for controlling the pressure of the fluid in said upper chamber, extending from an inner surface of said structure adjacent said opening; and means within said housing and mounted on the top surface of the structure for covering and uncovering said jet member and thereby to control the movement of the diaphragm, said last-named means including an arm extending unconfined through said opening and pivoted adjacent thereto.

3. In a pilot-controlled fluid pressure operated valve: a main valve casing having a bottom and side walls; a relatively shallow pilot-valve structure substantially coextensive with and secured to the upper surface of said casing and having a top and a side wall; said top wall being substantially parallel to the upper surface of the casing and having an opening therethrough; a housing mounted on the top surface of said structure and surrounding said opening; a flexible diaphragm member interposed at its margin between the interconnecting surfaces of the casing and the structure to form with the casing a lower pressure chamber, and with the structure and housing an upper pressure chamber; means connected to said diaphragm for controlling fluid flow through the main valve casing; a jet member, for controlling the pressure of the fluid in said upper chamber, extending from an inner surface of said structure adjacent said opening and having its axis substantially parallel to the top surface thereof; a substantially flat arm extending unconfined through said opening and pivoted adjacent the top surface of the structure; said arm being adapted to cover and uncover said jet member and thereby control the movement of the diaphragm; and means within said housing and mounted on the top surface of the structure for actuating said arm.

4. In a pilot-controlled fluid pressure operated valve: a main valve casing having a bottom and side walls; a relatively shallow pilot-valve structure substantially coextensive with and secured to the upper surface of said casing and having a top and a side wall; said top wall being substantially parallel to the upper surface of the casing and having an opening therethrough; a housing mounted on the top surface of said structure and surrounding said opening; a flexible diaphragm member interposed at its margin between the interconnecting surfaces of the casing and the structure to form with the casing a lower pressure chamber, and with the structure and housing an upper pressure chamber; means connected to said diaphragm for controlling fluid flow through the main valve casing; a jet member, for controlling the pressure of the fluid in said upper chamber, extending from an inner surface of said structure adjacent said opening and having its axis substantially parallel to the top surface thereof; a substantially flat armature extending unconfined through said opening and movable to cover and uncover said jet member and thereby control the movement of the diaphragm; an electromagnet within said housing for actuating said armature and comprising a core member mounted on the top surface of the structure, said armature being fulcrumed on said core member adjacent said top surface.

WILLIAM A. RAY.